US010175535B2

(12) United States Patent
Hirata

(10) Patent No.: US 10,175,535 B2
(45) Date of Patent: Jan. 8, 2019

(54) LIQUID CRYSTAL DISPLAY APPARATUS HAVING FOUR LIQUID CRYSTAL DOMAINS

(71) Applicant: Sakai Display Products Corporation, Sakai-shi, Osaka (JP)

(72) Inventor: Mitsuaki Hirata, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/432,151

(22) PCT Filed: Aug. 19, 2014

(86) PCT No.: PCT/JP2014/071663
§ 371 (c)(1),
(2) Date: Aug. 5, 2015

(87) PCT Pub. No.: WO2016/027316
PCT Pub. Date: Feb. 25, 2016

(65) Prior Publication Data
US 2016/0054604 A1    Feb. 25, 2016

(51) Int. Cl.
*G02F 1/1337* (2006.01)
*G02F 1/1343* (2006.01)
*G02F 1/1362* (2006.01)

(52) U.S. Cl.
CPC ...... *G02F 1/1337* (2013.01); *G02F 1/133707* (2013.01); *G02F 1/133788* (2013.01); *G02F 1/134336* (2013.01); *G02F 1/136227* (2013.01)

(58) Field of Classification Search
CPC combination set(s) only.
See application file for complete search history.

(56) References Cited

U.S. PATENT DOCUMENTS

2004/0169777 A1*  9/2004  Tanaka ............ G02F 1/133707
                                                                349/39
2009/0086141 A1   4/2009  Shoraku et al.
(Continued)

FOREIGN PATENT DOCUMENTS

JP         2003-149647 A      5/2003
WO      WO2006132369 A1    12/2006
(Continued)

*Primary Examiner* — Lauren Nguyen
(74) *Attorney, Agent, or Firm* — Rudy J. Ng; Bret E. Field; Bozicevic, Field & Francis LLP

(57) ABSTRACT

Provided is a liquid crystal display apparatus which has a reduced area of a dark line generated when light is transmitted through a pixel region, and excellent transmittance of light and image quality. The liquid crystal display apparatus has two substrates which respectively have an electrode and a photo alignment film sequentially formed on respective one surfaces, and are disposed so that the one surfaces thereof face to each other, wherein a liquid crystal layer including a vertical alignment type liquid crystal material is interposed between the photo alignment films; a plurality of pixel regions formed on the substrate in a matrix shape in a plane direction of the substrate; and at least two liquid crystal domains which are included in each pixel region, and have standard alignment directions different from each other defined by the photo alignment films. One electrode 2 has oblique slits 21 extending parallel to each standard alignment direction at the region corresponding to each liquid crystal domain. In addition, longitudinal slits 22 and 22 extending in the column direction are provided at the boundary portions of the liquid crystal domains arranged in the row direction, and lateral slits 23 and 23 extending in the row direction at the boundary portions of the liquid crystal domains arranged in the column direction. The longitudinal slits 22 and the lateral slits 23 are independent from the oblique slits 21 without continuing to the oblique slits 21.

4 Claims, 27 Drawing Sheets

(56) References Cited

U.S. PATENT DOCUMENTS

| | | | |
|---|---|---|---|
| 2009/0284703 A1* | 11/2009 | Shoraku | G02F 1/133753 349/129 |
| 2010/0045917 A1* | 2/2010 | Imai | G02F 1/133707 349/139 |
| 2014/0253853 A1 | 9/2014 | Yoshida et al. | |

FOREIGN PATENT DOCUMENTS

| | | |
|---|---|---|
| WO | WO2007123244 A1 | 11/2007 |
| WO | WO2013054828 A1 | 4/2013 |

* cited by examiner

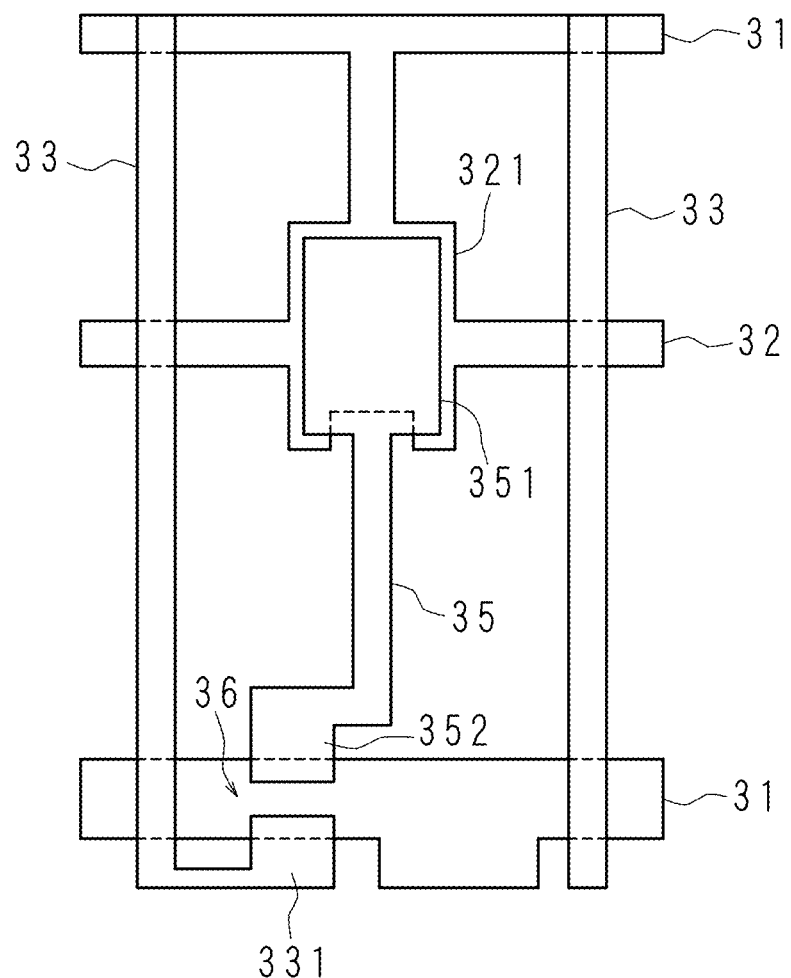
F I G. 4

F I G. 1 1
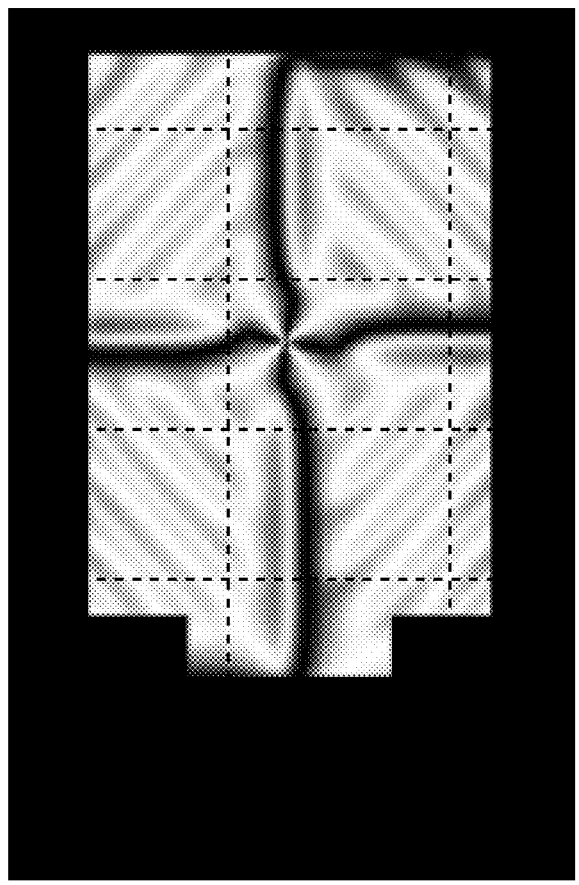

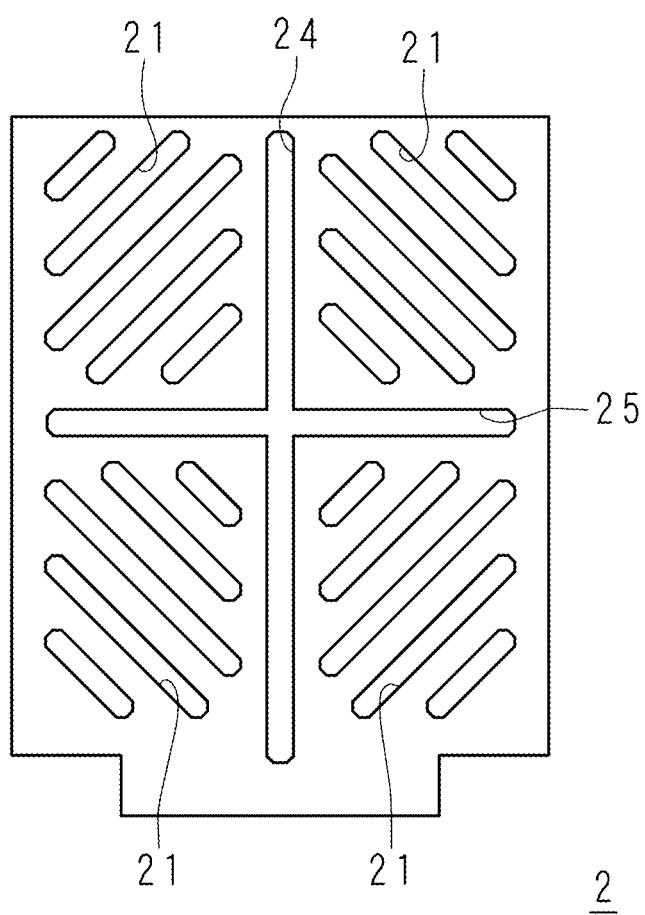
F I G. 1 2

F I G. 1 3
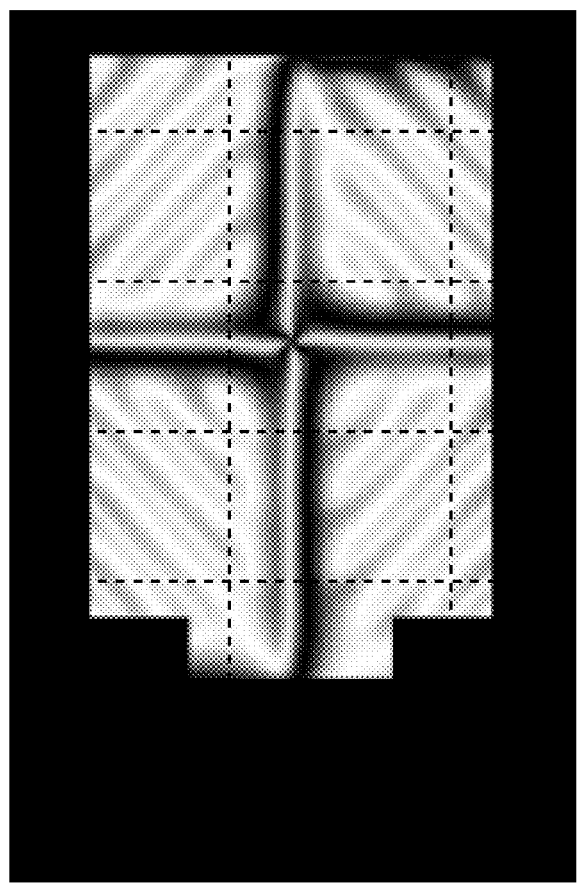

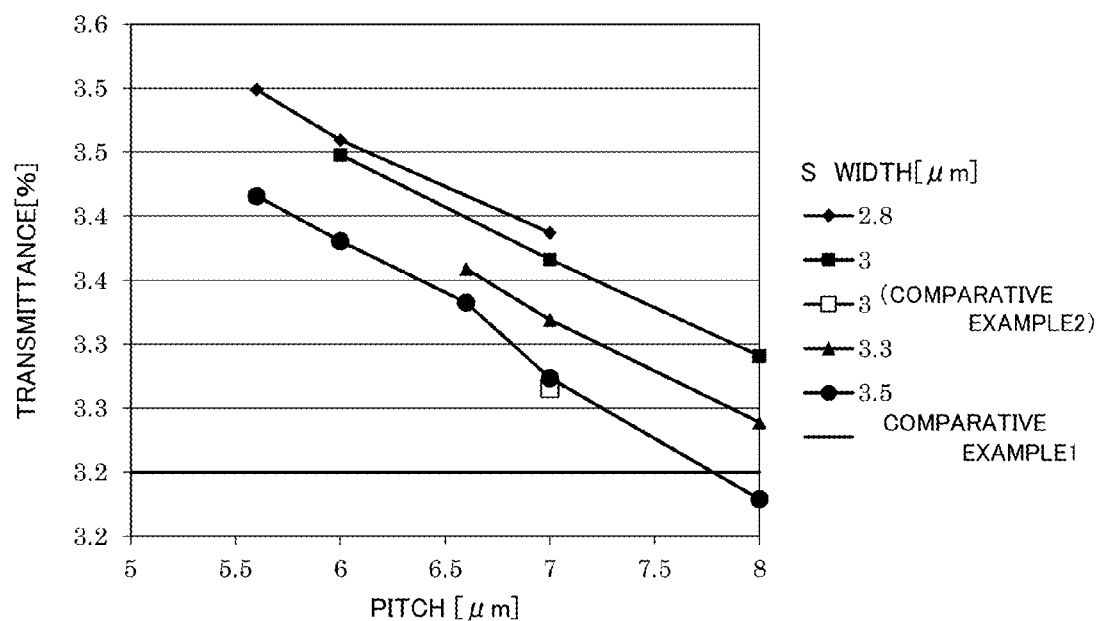
F I G. 1 5

F I G. 1 8
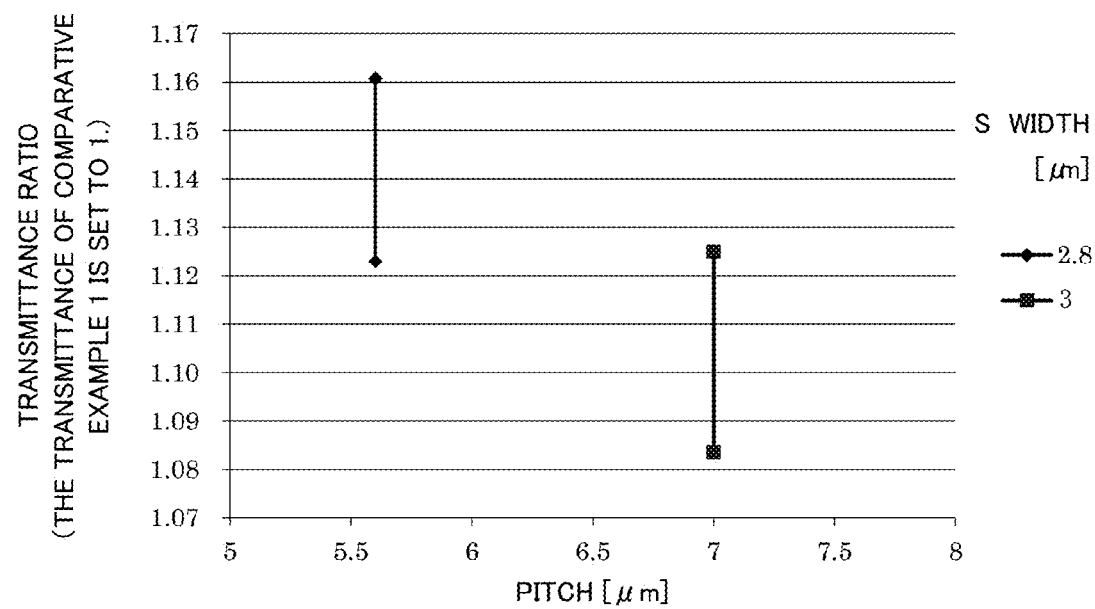

LIQUID CRYSTAL DISPLAY APPARATUS HAVING FOUR LIQUID CRYSTAL DOMAINS

CROSS-REFERENCE TO RELATED APPLICATIONS

This application is the national phase under 35 U.S.C. § 371 of PCT International Application No. PCT/JP2014/071663 which has an International filing date of Aug. 19, 2014 and designated the United States of America.

BACKGROUND

1. Technical Field

The present invention relates to a liquid crystal display apparatus included in a television receiver, a personal computer or the like.

2. Description of Related Art

Among display apparatuses, a liquid crystal display apparatus is a thin type display and has characteristics such as low power consumption. A display panel of the liquid crystal display apparatus has a color filter (CF) substrate, a liquid layer, an active matrix substrate (TFT substrate), and two polarizing plates. The CF substrate and the active matrix substrate are bonded to each other with a seal material interposed between them, and liquid crystal is injected between them to form a liquid crystal layer. The active matrix substrate has a pixel electrode on the liquid crystal layer side, and the CF substrate has a common electrode on the liquid crystal layer side. The two polarizing plates are disposed on a surface opposite to the liquid crystal layer side of each of the CF substrate and the active matrix substrate.

The liquid crystal display apparatus using a vertical alignment type material as a liquid crystal material is called a vertical alignment (VA) mode liquid crystal display apparatus. The liquid crystal display apparatus, in order to improve transmittance and response speed thereof, employs an alignment division structure in which a plurality of liquid crystal domains are formed in one pixel. As a method of forming the alignment division structure, there may be a multi-domain vertical alignment mode (MVA). In the MVA mode, an alignment regulation structure is obtained by providing a linear projection on the liquid crystal layer side of the substrate which sandwiches the liquid crystal layer, and providing an opening part (slit) on the pixel electrode. By the alignment regulation structure, a plurality of liquid crystal domains are formed in the pixel (for example, Japanese Patent Laid-open Publication No. 2003-149647). By finely forming the slit, an alignment of the liquid crystal molecules may be more controlled, and the transmittance of light and response speed may be improved.

The VA mode, which is configured in such a manner that alignment films such as a photo alignment film are respectively provided on the liquid crystal layer sides of both substrates facing each other with the liquid crystal layer interposed between them so that pre-tilt directions (alignment treatment directions) are orthogonal to each other, and the liquid crystal molecules have a twist alignment during applying a voltage thereto, is called a vertical alignment twisted nematic (VATN) (for example, International Publication No. 2006/132369). Among them, a structure, in which four liquid crystal domains which are divided into two rows and two columns during applying a voltage thereto are formed in one pixel region, by regulating the pre-tilt directions using the two alignment films, is called a 4D structure.

FIG. 19 is a plan view illustrating a pixel region of the VATN mode liquid crystal display apparatus having the 4D structure.

In FIG. 19, dotted line arrows illustrate pre-tilt directions which are regulated by the photo alignment film provided on the active matrix substrate, and solid line arrows illustrate pre-tilt directions which are regulated by the photo alignment film provided on the CF substrate. In addition, tilt direction (standard alignment direction) of each liquid crystal domain when a voltage is applied to the liquid crystal layer is illustrated by a direction of pins. FIG. 19 illustrates that the liquid crystal molecules are tilted so that a circular plate part of the pin is close to a viewer who views the liquid crystal display apparatus. That is, the standard alignment direction is oblique 45°.

The pixel electrode of the liquid crystal display apparatus has no slit formed therein.

FIG. 20 is a plan view illustrating a light transmission state of a pixel region in FIG. 19, and FIG. 21 is a plan view illustrating the light transmission state of the pixel region when a wiring and a contact hole are disposed.

From FIGS. 20 and 21, it can be seen that dark lines having a wide width are generated a boundary portion of the liquid crystal domain. The dark lines are generated due to the liquid crystal molecules being aligned in a direction vertical or parallel to a polarizing axis (longitudinal direction and lateral direction axes) at the boundary portion of the liquid crystal domain, and thereby light is not transmitted therethrough.

The transmittance of light is decreased by the dark lines. Particularly, in a high definition display having a small pixel, the effect of a decrease in transmittance of light by the dark lines becomes larger.

Assembling the above-described MVA mode in the VATN mode having the 4D structure has also been attempted (multi-domain VATN mode, for example, International Publication No. 2013/054828 and the like).

FIG. 22 is a plan view illustrating a pixel electrode 52 of the active matrix substrate in the pixel region of a multi-domain VATN mode liquid crystal display apparatus.

In the pixel electrode 52, a plurality of oblique slits 21 are formed by matching with each tilt direction of the oblique 45° of four liquid crystal domains. By the oblique slits 21, the above-described dark lines generated at the boundary portion of the VATN mode liquid crystal domain are reduced, and thus the transmittance of light may be increased. A contact hole 12 is formed in a center part of the pixel region.

FIG. 23 is a plan view illustrating the light transmission state of the pixel region in FIG. 22, and FIG. 24 is a plan view illustrating the light transmission state of the pixel region when the wiring and the contact hole are disposed.

Also in this structure, it can be seen that dark lines having a constant width are formed at the boundary portion, and a sufficient effect may not be obtained. In addition, the dark lines along the oblique slits 21 are also generated.

FIG. 25 is a partial enlarged view of FIG. 24.

In FIG. 25, the alignment of the liquid crystal molecules is illustrated by pins.

As illustrated in FIG. 25, most of liquid crystal molecules 61 are aligned vertical to a polarizing axis at the boundary portion, while some liquid crystal molecules 61 are aligned substantially parallel to the polarizing axis, and a portion having a constant width in which light is not transmitted is generated, and thereby the transmittance of light is decreased.

FIG. 26 is a plan view illustrating the pixel electrode 52 of the active matrix substrate in the pixel region of another liquid crystal display apparatus.

The pixel electrode 52 is provided with slits 28 and 28, and slits 29 and 29, in addition to the plurality of oblique slits 21. The slit 28 is formed by connecting each polarizing axis side end part of three oblique slits to a slit parallel to a longitudinal polarizing axis. The slit 29 is formed by connecting each polarizing axis side end part of two oblique slits to a slit parallel to a lateral polarizing axis.

FIG. 27 is a plan view illustrating the light transmission state of the pixel region in FIG. 26.

As illustrated in FIG. 27, it can be seen that the dark lines having a wide width are generated in a portion in which the polarizing axis side end parts of the oblique slits are connected to the slit parallel to each polarizing axis.

SUMMARY

In consideration of the above-described circumstances, it is an object of the present invention to provide a liquid crystal display apparatus which has a reduced area of a dark line generated when light is transmitted through a pixel region, and excellent transmittance of light and image quality.

According to one aspect of the present invention, there is provided a liquid crystal display apparatus wherein two substrates which respectively have an electrode and a photo alignment film sequentially formed on respective one surfaces are disposed so that the one surfaces face to each other; a liquid crystal layer including a vertical alignment type liquid crystal material is interposed between the photo alignment films; a plurality of pixel regions are formed on the substrate in a matrix shape in a plane direction of the substrate, wherein the liquid crystal display apparatus comprises: at least two liquid crystal domains which are included in each pixel region and have standard alignment directions different from each other defined by the photo alignment films; and a plurality of opening parts which are included in one electrode, and extend parallel to each standard alignment direction at each region corresponding to each liquid crystal domain, wherein the one electrode has a second opening part which extends in the other direction orthogonal to one direction between the two liquid crystal domains arranged in parallel with the one direction, without being continued to the opening part.

In the present invention, the liquid crystal molecules which present at a boundary portion of the liquid crystal domain are aligned along a direction in which the boundary extends by the second opening part. Accordingly, the liquid crystal molecules aligned in the direction vertical or substantially parallel to a polarizing axis are decreased, and a width of a portion in which the liquid crystal molecules are present is narrowed, such that the width of a dark line is narrower than the conventional liquid crystal display apparatus so as to improve the transmittance of light.

The pixels of a general RGB stripe structure are vertically long, and a length of the liquid crystal domain boundary in the column direction is longer than the length of the liquid crystal domain boundary in the row direction. Thereby, when a direction in which the second opening part extends is the column direction, the transmittance improving effect is more increased.

According to another aspect of the present invention, there is provided a liquid crystal display apparatus wherein two substrates which respectively have an electrode and a photo alignment film sequentially formed on respective one surfaces are disposed so that the one surfaces face to each other; a liquid crystal layer including a vertical alignment type liquid crystal material is interposed between the photo alignment films; a plurality of pixel regions are formed on the substrate in a matrix shape in a plane direction of the substrate, wherein the liquid crystal display apparatus comprises: at least two liquid crystal domains which are included in each pixel region and have standard alignment directions different from each other defined by the photo alignment films; and a plurality of opening parts which are included in one electrode, and extend parallel to each standard alignment direction at each region corresponding to each liquid crystal domain, wherein the one electrode has a second opening part which extends in the other direction between the two liquid crystal domains arranged in parallel with one direction, with being continued to the opening part at one end part side of the other direction orthogonal to the one direction.

In the present invention, the liquid crystal molecules present at a boundary portion of the liquid crystal domain are aligned along a direction in which the boundary extends by the second opening part. Accordingly, the liquid crystal molecules aligned in the direction vertical or parallel to the polarizing axis are decreased, and the width of the portion in which the liquid crystal molecules are present is narrowed, such that the width of the dark line is narrowed to improve the transmittance of light.

In the liquid crystal display apparatus according to the present invention, the one electrode has a third opening part which extends in the one direction between the two liquid crystal domains arranged in parallel with the other direction, without being continued to the opening part.

In the present invention, since the second opening part and the third opening part are formed at both boundary portions of liquid crystal domains, the transmittance of light is improved.

In the liquid crystal display apparatus according to the present invention, the one electrode has a third opening part which extends in the one direction between the two liquid crystal domains arranged in the other direction, with being continued to the opening part at one end part side of the one direction.

In the present invention, since the second opening part and the third opening part are formed at both boundary portions of liquid crystal domains, the transmittance of light is more improved.

In the liquid crystal display apparatus according to the present invention, a position of the second opening part or a position of the third opening part is matched with a position of a wiring which is formed on the one substrate.

In the present invention, since the dark lines generated at the liquid crystal domain boundary are matched (aligned) with the wiring of the substrate such as an active matrix substrate, transmission loss of light may be suppressed.

In the liquid crystal display apparatus according to the present invention, the one substrate has a contact hole nearer to an end part of the pixel region.

In the present invention, since the contact hole is not formed in a center part of the pixel region, and securing a connection region of the pixel electrode with a drain electrode at the center portion of the pixel region is not required, it is possible to dispose a center side end part of the second opening part or the third opening part nearer the center part thereof, and increase the length of each opening part. Alternately, the second opening part or the third opening part is continuous without being divided at the center portion, while being intersected with each other. Accordingly, the transmittance of light may be more improved.

ADVANTAGEOUS EFFECTS

According to the present invention, since the electrode has the second opening part which extends in the boundary direction of the liquid crystal domain between the two liquid crystal domains, without being continued to the opening part which extends parallel to the standard alignment direction, the liquid crystal molecules present at the boundary portion of the liquid crystal domain are aligned along the direction in which the boundary extends. Accordingly, the liquid crystal molecules aligned in the direction vertical or parallel to the polarizing axis are decreased, and the width of the portion in which the liquid crystal molecules are present is narrowed, such that the width of a dark line is narrower than the conventional liquid crystal display apparatus so as to improve the transmittance of light. In a high definition display having a small pixel, the effect of an increase in transmittance of light by the dark lines becomes larger with improved image quality of the liquid crystal display apparatus.

The above and further objects and features will more fully be apparent from the following detailed description with accompanying drawings.

BRIEF DESCRIPTION OF THE SEVERAL VIEWS OF THE DRAWINGS

FIG. 4 is a plan view illustrating a wiring of an active matrix substrate;

FIG. 11 is a plan view illustrating a light transmission state in the pixel region of FIG. 10;

FIG. 12 is a plan view illustrating a pixel electrode in one pixel region of a display panel according to Embodiment 4 of the present invention;

FIG. 13 is a plan view illustrating a light transmission state in the pixel region of FIG. 12;

FIG. 15 is a graph illustrating a relation between a pitch and transmittance when a width of oblique slits is changed in the liquid crystal display apparatuses of Embodiments 1 and 2;

FIG. 18 is a graph illustrating a relation between the pitch and the transmittance ratio when the width of oblique slits is changed in the liquid crystal display apparatuses of Embodiments 3 and 4;

Hereinafter, the present invention will be described in detail with reference to the accompanying drawings illustrating embodiments thereof.

Embodiment 1

Figure 1:
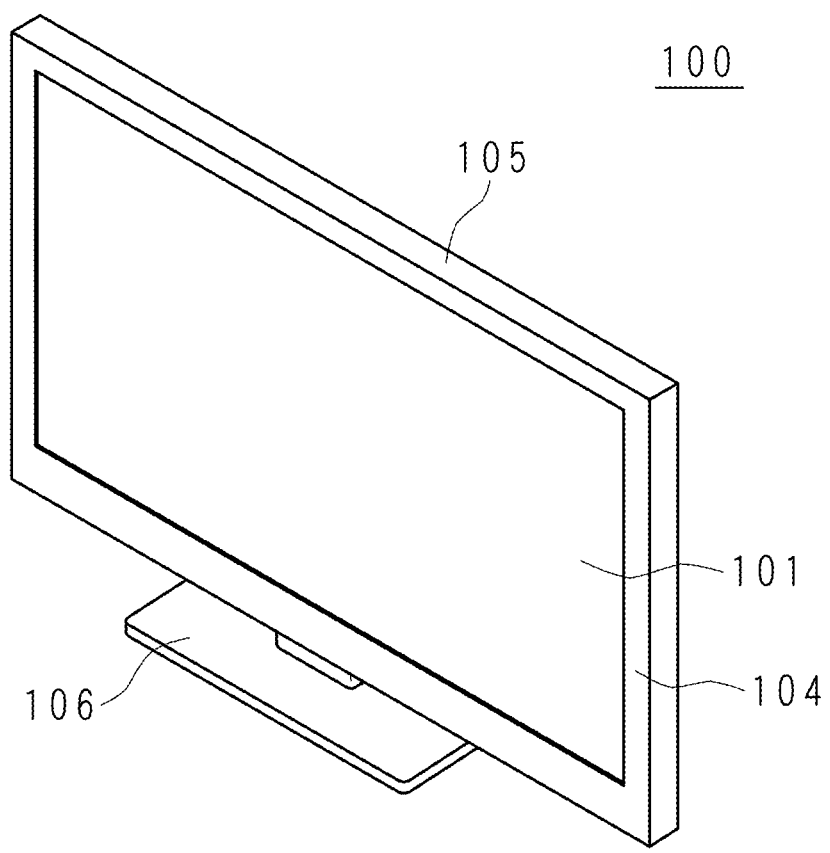
FIG. 1 is a perspective view illustrating an appearance of a liquid crystal display apparatus according to Embodiment 1 of the present invention.
Figure 2:
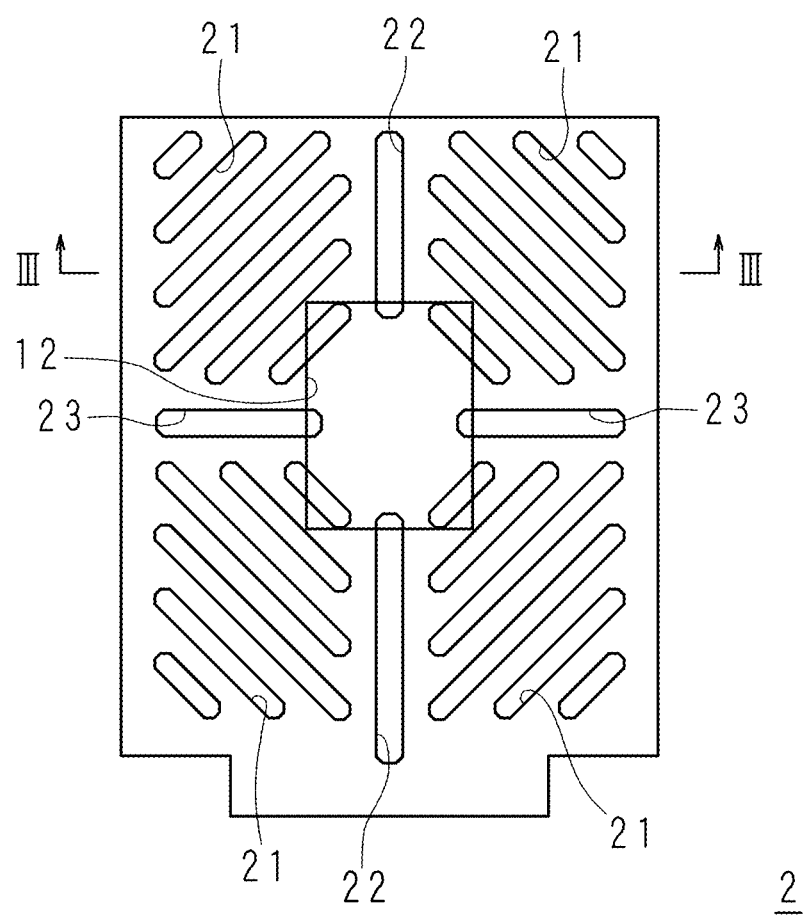
FIG. 2 is a plan view illustrating a pixel electrode in one pixel region of a display panel of the liquid crystal display apparatus according to Embodiment 1 of the present invention.
Figure 3:
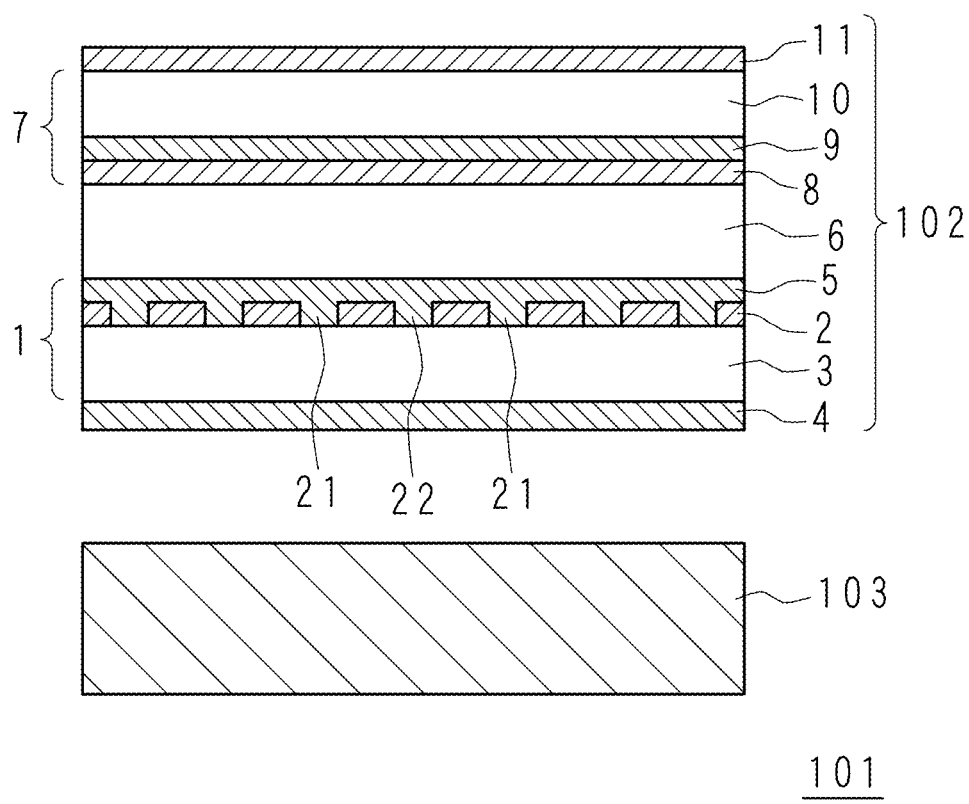
FIG. 3 is a cross-sectional view taken on line III-III of FIG. 2.
Figure 5:
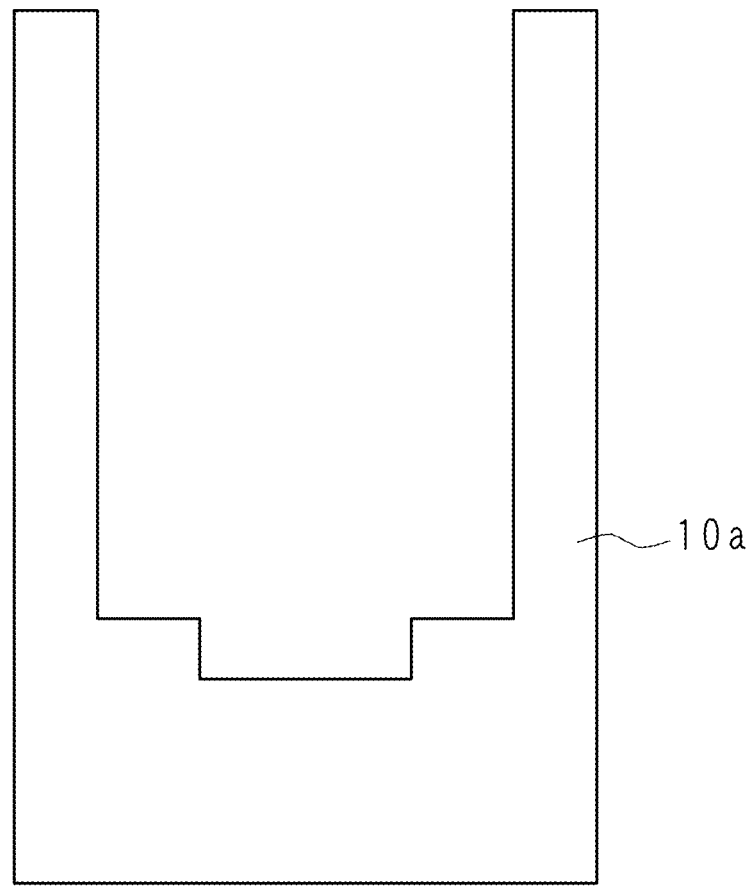
FIG. 5 is a plan view illustrating a black matrix of a CF substrate.

FIG. 1 is a perspective view illustrating an appearance of a liquid crystal display apparatus 100 according to Embodiment 1 of the present invention, FIG. 2 is a plan view illustrating a pixel electrode 2 in one pixel region of a display panel 102 of the liquid crystal display apparatus 100, FIG. 3 is a cross-sectional view of a display module 101 taken on line III-III of FIG. 2, FIG. 4 is a plan view illustrating a wiring of an active matrix substrate 1, and FIG. 5 is a plan view illustrating a black matrix of a CF substrate 7.

The liquid crystal display apparatus 100 includes a display module 101 having the display panel 102 and a backlight unit 103, a front cabinet 104 and a rear cabinet 105 which are made of a synthetic resin and house the display module 101 so as to sandwich it between them, and a stand 106. The display module 101 is formed in a laterally long rectangular shape as a whole, and housed in the front cabinet 104 and the rear cabinet 105 in a vertical position.

The display panel 102 according to Embodiment 1 of the present invention has a plurality of pixel regions disposed in a matrix shape in a plane direction.

The display panel 102 is a multi-domain VATN mode display panel, and the pixel electrode 2 of the active matrix substrate 1 has a plurality of oblique slits 21 formed therein corresponding to each tilt direction of oblique 45° of four liquid crystal domains.

In addition, the pixel electrode 2 is provided with longitudinal slits 22 and 22 which extend in a column direction at the boundary portions of the liquid crystal domains arranged in a row direction, and lateral slits 23 and 23 which extend in the row direction at the boundary portions of the liquid crystal domains arranged in the column direction. The longitudinal slits 22 and the lateral slits 23 are independent from the oblique slits 21 without continuing to the oblique slits 21. An angle between the column direction and an axial center of the longitudinal slits 22 is a range of ±5° or less, and an angle between the row direction and the axial center of the lateral slits 23 is a range of ±5° or less.

The pixel electrode 2 is formed with having the oblique slits 21, the longitudinal slits 22, and the lateral slits 23, by forming an ITO film by a sputtering method, and then patterning it. A contact hole 12 is formed in a center part of the pixel region, and the pixel electrode 2 is also formed on the contact hole 12.

As illustrated in FIG. 3, the display panel 102 of the display module 101 has the active matrix substrate 1, the CF substrate 7, a liquid crystal layer 6, and two polarizing plates 4 and 11. The CF substrate 7 and the active matrix substrate 1 are adhered to each other with a seal material interposed between them, and a vertical alignment type material is injected between them to form the liquid crystal layer 6. The two polarizing plates 11 and 4 are disposed on a surface opposite to the liquid crystal layer 6 side of each of the respective CF substrate 7 and the active matrix substrate 1.

A substrate part 3 of the active matrix substrate 1 includes a thin-film transistor (TFT) 36 (see FIG. 4) to be described below, a plurality of gate wirings (scanning wirings) 31 which provides a scanning signal to the TFT 36, and a plurality of source wirings (signal wirings) 33 which provides an image signal to the TFT 36, which are formed on an insulating substrate made of a glass, for example.

As illustrated in FIG. 4, the gate wirings 31 and a Cs wiring 32 extend parallel to each other, and the source wirings 33 intersect the gate wirings 31 and the Cs wiring 32, and extend parallel to each other.

The Cs wiring 32 has a drain opposing part 321 formed in a rectangular shape at a center part thereof.

The left source wiring 33 in FIG. 4 is provided with a source electrode 331 formed in a rectangular shape at a lower end part thereof so as to be oriented toward the right source wiring 33.

A drain electrode 35 has a Cs opposing part 351 formed in a smaller rectangular shape than the drain opposing part 321, and a source drain opposing part 352 facing the source electrode 331 in the plane direction. The drain opposing part 321 of the Cs wiring 32 and the Cs opposing part 351 of the drain electrode 35 face to each other with a gate insulation film (not illustrated) interposed between them, and auxiliary capacitor (Cs) is formed in this region.

A gate electrode is formed at a leftward portion of the lower gate wiring 31, and the gate electrode, the source electrode 331, and the source drain opposing part 352 form the TFT 36.

As illustrated in FIG. 3, the pixel electrode 2 having the above-described oblique slits 21, the longitudinal slits 22, and the lateral slits 23 is formed on the liquid crystal layer 6 side of the substrate part 3, and the pixel electrode 2 is covered with the photo alignment film 5. The drain electrode 35 is electrically connected to the pixel electrode 2 through the contact hole 12.

The base part 10 of the CF substrate 7 is formed by arranging a black matrix (BM) and a color filter (not illustrated) such as red (R), green (G), and blue (B) and the like on an insulating substrate made of glass, for example. FIG. 5 is a plan view illustrating a BM 10a.

A common electrode 9 made of ITO, or the like, for example, is formed on the liquid crystal layer 6 side of the base part 10. The common electrode 9 is covered with a photo alignment film 8.

The polarizing plates 4 and 11 are disposed so that the respective polarizing axes are orthogonal to each other.

The backlight unit 103 is disposed on a back side of the display panel 102. The backlight unit 103 may be any one of an edge light type (side light type, or light guide plate type backlight), and a direct type backlights. In the case of the edge light type backlight, the backlight unit 103 is configured to house an optical sheet, the light guide plate, and a light source such as an LED substrate and the like, in a chassis.

Figure 6:
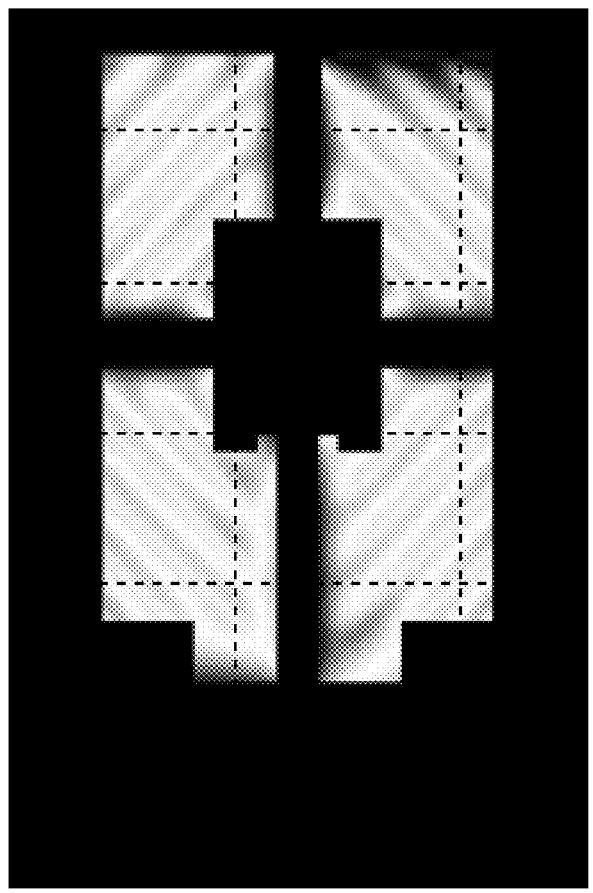
FIG. 6 is a plan view illustrating a light transmission state in the pixel region of FIG. 2.

FIG. 6 is a plan view illustrating a light transmission state in the pixel region of FIG. 2.

From FIG. 6, it can be seen that a width of dark lines generated at the boundary portion of each liquid crystal domain becomes narrower than the above-described conventional liquid crystal display apparatus.

Figure 7:
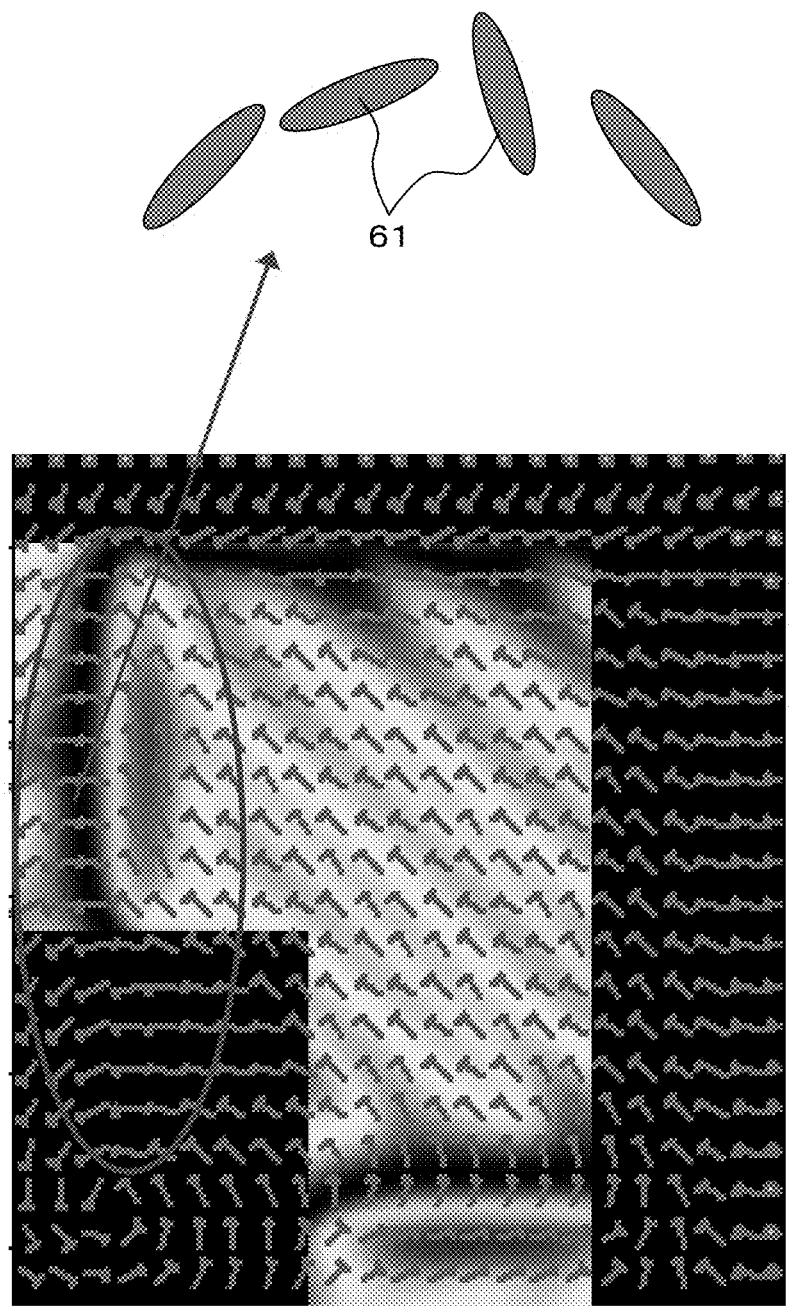
FIG. 7 is a partial enlarged view of FIG. 6.

FIG. 7 is a partial enlarged view of FIG. 6.

In FIG. 7, the alignment of the liquid crystal molecules 61 is illustrated by pins.

As illustrated in FIG. 7, the liquid crystal molecules 61 which present at the boundary portion of the liquid crystal domain are aligned along a direction in which the boundary extends the longitudinal slits 22. Also in the lateral slit 23, the liquid crystal molecules 61 which present at the boundary portion of the liquid crystal domain are similarly aligned along the direction in which the boundary extends. Accordingly, the liquid crystal molecules 61 aligned in a direction vertical to one polarizing axis on one polarizing axis are decreased, and the liquid crystal molecules 61 aligned in a direction parallel to one polarizing axis on another polarizing axis are decreased, and the width of a portion in which the liquid crystal molecules 61 are present is narrowed, such that the width of the dark line is also narrowed so as to improve the transmittance of light.

In the present embodiment, the dark lines generated at the liquid crystal domain boundary coincide with a metal wiring (the Cs wirings 32, the gate wirings 31, and the drain electrode 35) of the active matrix substrate 1, and thereby transmission loss of light is suppressed. That is, the liquid crystal molecules are aligned in a longitudinal direction by setting an irradiation direction of ultraviolet rays of photo alignment film 5 of the active matrix substrate 1 to a vertical stripe, and the longitudinal slits 22 and the lateral slits 23 are aligned to the metal wiring, and thereby excellent transmittance of light may be obtained.

Since the pixels of a general RGB stripe structure are vertically long, a length of the liquid crystal domain boundary in the column direction is longer than the length of the liquid crystal domain boundary in the row direction. Accordingly, a transmittance improving effect by providing the longitudinal slits 22 is increased, and further, the transmittance improving effect by aligning the longitudinal slits 22 to the metal wire is more increased.

Embodiment 2.

Figure 8:
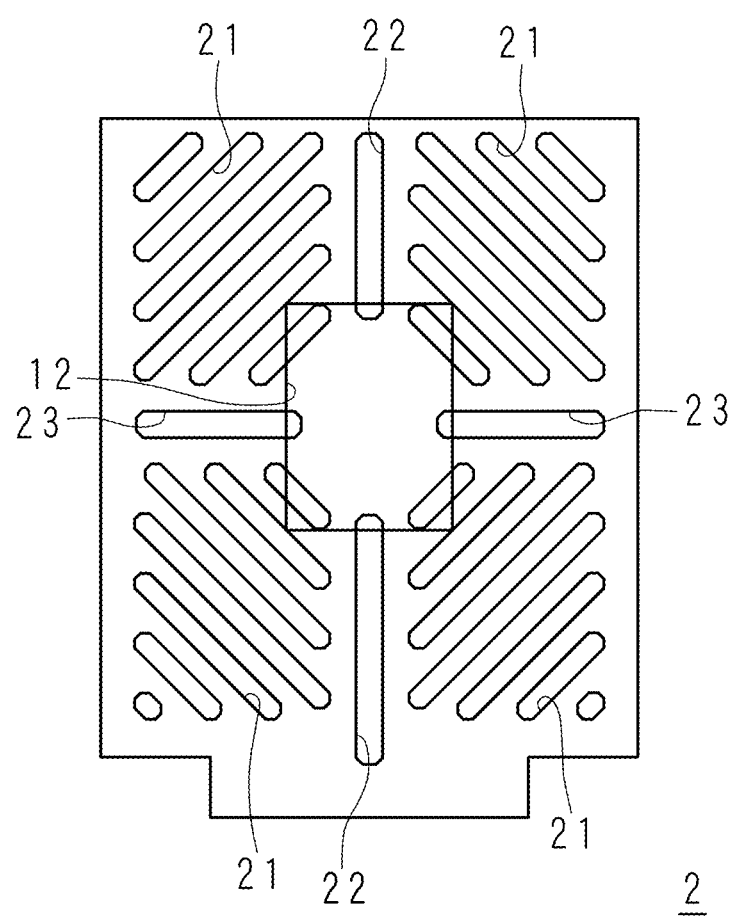
FIG. 8 is a plan view illustrating a pixel electrode in one pixel region of a display panel according to Embodiment 2 of the present invention.

FIG. 8 is a plan view illustrating a pixel electrode 2 in one pixel region of a display panel according to Embodiment 2 of the present invention.

The pixel electrode 2 according to the present embodiment is, similar to the pixel electrode 2 according to Embodiment 1, also provided with longitudinal slits 22 and 22 which extend in the column direction at the boundary portions of the liquid crystal domains arranged in the row direction, and lateral slits 23 and 23 which extend in the row direction at the boundary portions of the liquid crystal domains arranged in the column direction. The longitudinal slits 22 and the lateral slits 23 are independent from the oblique slits 21.

Also in the present embodiment, the width (gap) between the oblique slits 21 is different from the width between the oblique slits 21 of the pixel electrode 2 according to Embodiment 1.

Figure 9:
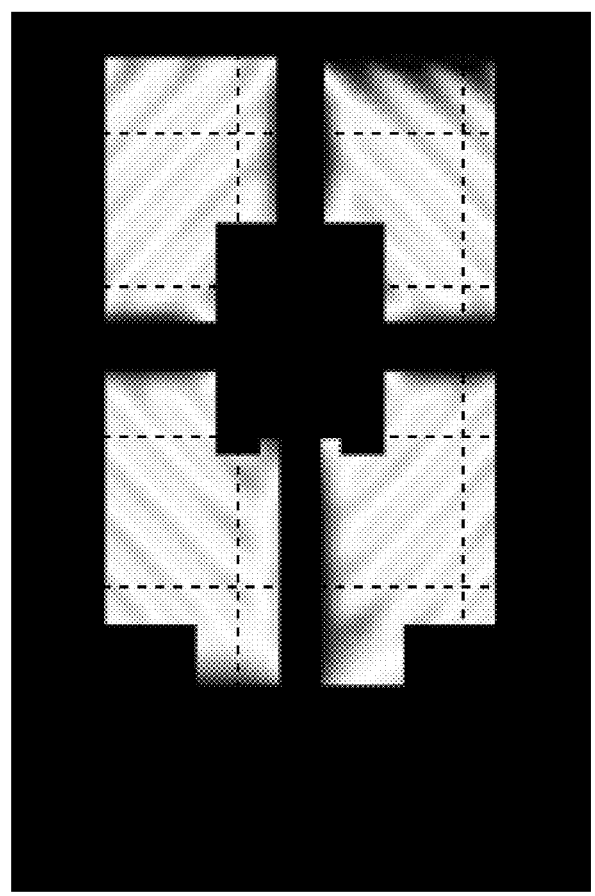
FIG. 9 is a plan view illustrating a light transmission state in the pixel region of FIG. 8.

FIG. 9 is a plan view illustrating a light transmission state in the pixel region of FIG. 8.

From FIG. 9, it can be seen that the width of dark lines generated at the boundary portions of the liquid crystal domains becomes narrower.

Embodiment 3.

Figure 10:
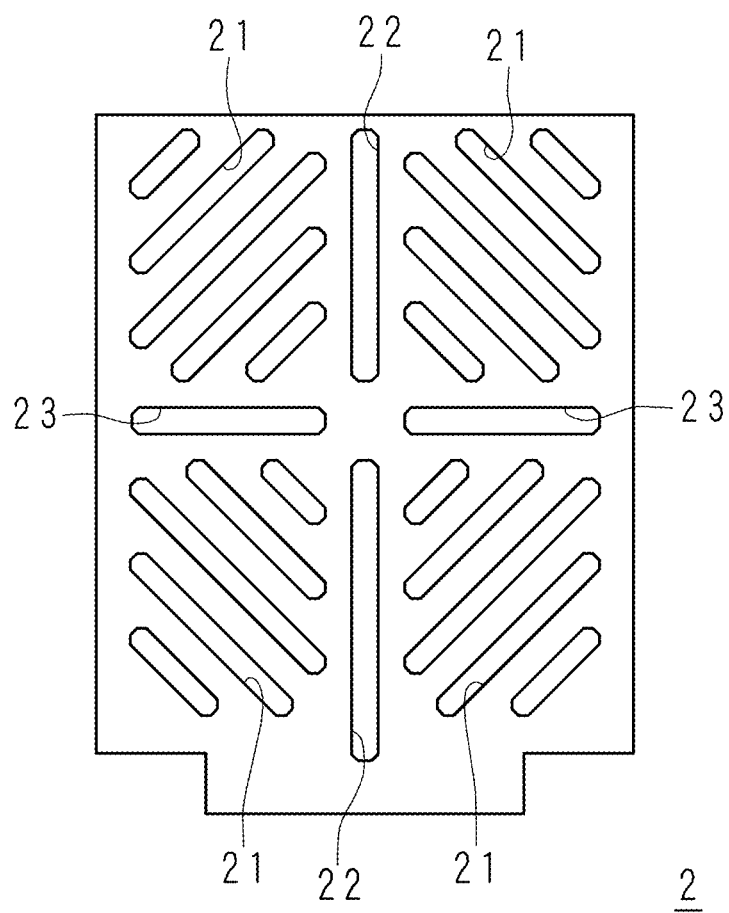
FIG. 10 is a plan view illustrating a pixel electrode in one pixel region of a display panel according to Embodiment 3 of the present invention.

FIG. 10 is a plan view illustrating a pixel electrode 2 in one pixel region of a display panel according to Embodiment 3 of the present invention.

In the present embodiment, unlike the Embodiments 1 and 2, the contact hole 12 is formed at a portion in which the TFT 36 is formed nearer to an end part of the pixel region without being formed in the center part of the pixel region.

The pixel electrode 2 according to the present embodiment is, similar to the pixel electrodes 2 according to Embodiments 1 and 2, also provided with longitudinal slits 22 and 22 which extend in the column direction at the boundary portions of the liquid crystal domains arranged in the row direction, and lateral slits 23 and 23 which extend in the row direction at the boundary portions of the liquid crystal domains arranged in the column direction. The longitudinal slits 22 and the lateral slits 23 are independent from the oblique slits 21.

In the present embodiment, since the contact hole 12 is not formed in the center part of the pixel region, and securing a connection region with the drain electrode 35, that is, the TFT 36 at the center portion of the pixel region is not required, it is possible to dispose a center side end part of the respective longitudinal slits 22 and the lateral slits 23 nearer the center part thereof, and increase the length of each slit.

Accordingly, it is possible to more improve the transmittance of light.

FIG. 11 is a plan view illustrating a light transmission state in the pixel region of FIG. 10.

From FIG. 11, it can be seen that the width of dark lines generated at the boundary portions of the liquid crystal domains becomes narrower.

Embodiment 4.

FIG. 12 is a plan view illustrating a pixel electrode 2 in one pixel region of a display panel according to Embodiment 4 of the present invention.

In the present embodiment, unlike the Embodiments 1 and 2, the contact hole 12 is formed at the portion in which the TFT 36 is formed nearer the end part of the pixel region without being formed in the center part of the pixel region.

The pixel electrode 2 is provided with a longitudinal slit 24 which extends in the column direction at the boundary portions of the liquid crystal domains arranged in the row direction, and a lateral slit 25 which extends in the row direction at the boundary portions of the liquid crystal domains arranged in the column direction. The longitudinal slit 24 and the lateral slit 25 are independent from the oblique slits 21. In addition, the longitudinal slit 24 and the lateral slit 25 are continuous without being divided at the center part, while being intersected with each other.

In the present embodiment, since the contact hole 12 is not formed in the center part of the pixel region, and securing a connection region with the drain electrode 35 (i.e. the TFT 36) at the center portion of the pixel region is not required, a center side end part of the respective longitudinal slits 24 and the lateral slits 25 can be continuous without being divided at the center part, while being intersected with each other.

Accordingly, it is possible to more improve the transmittance of light, as well as the pixel electrode 2 may be easily patterned while prevent an occurrence of damage thereto.

FIG. 13 is a plan view illustrating a light transmission state in the pixel region of FIG. 12.

From FIG. 13, it can be seen that the width of dark lines generated at the boundary portions of the liquid crystal domains becomes narrower.

Embodiment 5.

Figure 14:
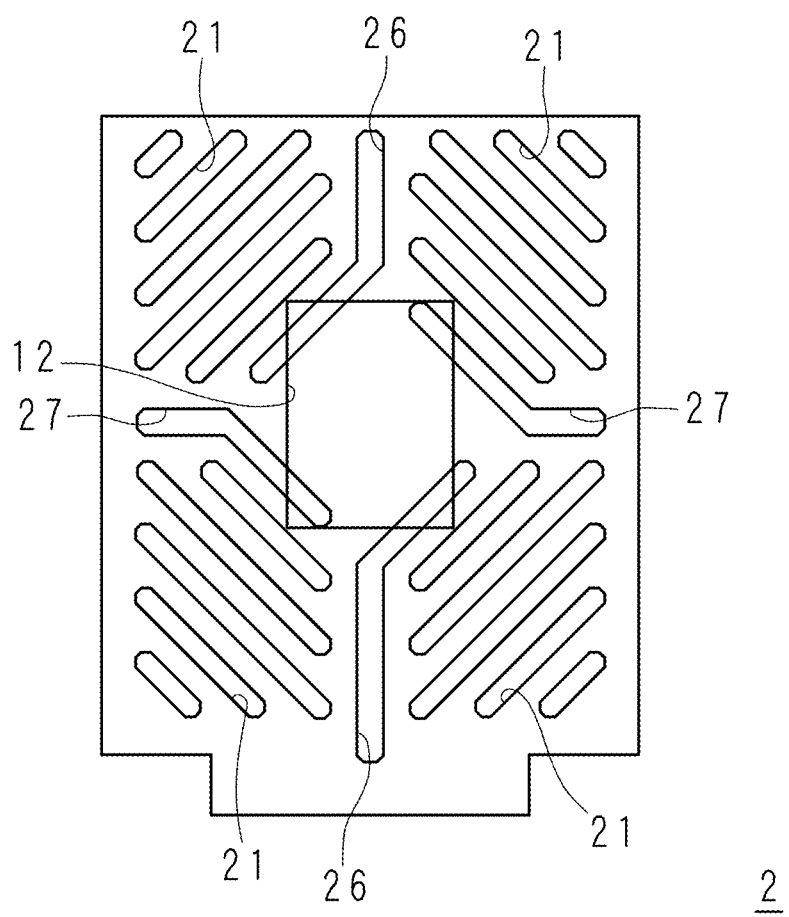
FIG. 14 is a plan view illustrating a pixel electrode in one pixel region of a display panel according to Embodiment 5 of the present invention.

FIG. 14 is a plan view illustrating a pixel electrode 2 in one pixel region of a display panel according to Embodiment 5 of the present invention.

In the present embodiment, slits 26 have a shape in which a slit extending in the column direction is consecutively formed with the oblique slit at one end part thereof. In addition, slits 27 have a shape in which a slit extending in the row direction is consecutively formed with the oblique slit at one end part thereof.

Also in the present embodiment, by the portions of the slits 26 and the slits 27 which extend in the column direction thereof, the liquid crystal molecules may be aligned along the direction in which the boundaries extend. Accordingly, the liquid crystal molecules aligned in the direction vertical or parallel to the polarizing axis are decreased, and the width of a portion in which the liquid crystal molecules are present is narrowed, such that the width of the dark line is also narrowed to improve the transmittance of light.

EXAMPLE

Hereinafter, examples and comparative examples will be described in detail, however the present invention is not limited to the examples.

(1) Pixel Electrode of Embodiments 1 and 2

Examples 1 to 14

Pixel electrodes 2 of Examples 1 to 14 were formed by patterning so as to have a width (gap) (L: μm) between the oblique slits 21, a width (S: μm) of the oblique slits 21, a pitch (L+S), a width (μm) of the longitudinal slits 22 and the lateral slits 23 of each numerical value as illustrated in Table 1 below.

TABLE 1

| EXAMPLE | A | B | C | D | E | F |
|---|---|---|---|---|---|---|
| 1 | 2.8 | 2.8 | 5.6 | 3.5 | 3.5 | 1.093345 |
| 2 | 3.2 | 2.8 | 6 | 3.5 | 3.5 | 1.081028 |
| 3 | 4.2 | 2.8 | 7 | 3.5 | 3.4 | 1.05845 |
| 4 | 3 | 3 | 6 | 3.5 | 3.4 | 1.077476 |
| 5 | 4 | 3 | 7 | 3.5 | 3.4 | 1.051942 |
| 6 | 5 | 3 | 8 | 3.5 | 3.3 | 1.028426 |
| 7 | 3.3 | 3.3 | 6.6 | 3.5 | 3.4 | 1.049684 |
| 8 | 3.7 | 3.3 | 7 | 3.5 | 3.3 | 1.037245 |
| 9 | 4.7 | 3.3 | 8 | 3.5 | 3.2 | 1.012216 |
| 10 | 2.1 | 3.5 | 5.6 | 3.5 | 3.4 | 1.067414 |
| 11 | 2.5 | 3.5 | 6 | 3.5 | 3.4 | 1.056403 |
| 12 | 3.1 | 3.5 | 6.6 | 3.5 | 3.3 | 1.041402 |
| 13 | 3.5 | 3.5 | 7 | 3.5 | 3.3 | 1.023048 |
| 14 | 4.5 | 3.5 | 8 | 3.5 | 3.2 | 0.993481 |

TABLE 1-continued

| EXAMPLE | A | B | C | D | E | F |
|---|---|---|---|---|---|---|
| COMPARATIVE EXAMPLE1 | — | — | — | — | 3.2 | 1 |
| COMPARATIVE EXAMPLE2 | 4 | 3 | 7 | — | 3.3 | 1.020503 |

A: WIDTH BETWEEN THE OBLIQUE SLITS (L: μ m)
B: WIDTH OF THE OBLIQUE SLIT (S: μ m)
C: PITCH(L + S)
D: WIDTH OF THE LONGITUDINAL SLIT AND THE LATERAL SLIT (μ m)
E: TRANSMITTANCE
F: TRANSMITTANCE RATIO

Comparative Example 1

The pixel electrode of Comparative Example 1 is a pixel electrode which has no oblique slit 21, longitudinal slit 22, and lateral slit 23.

Comparative Example 2

Figure 22:
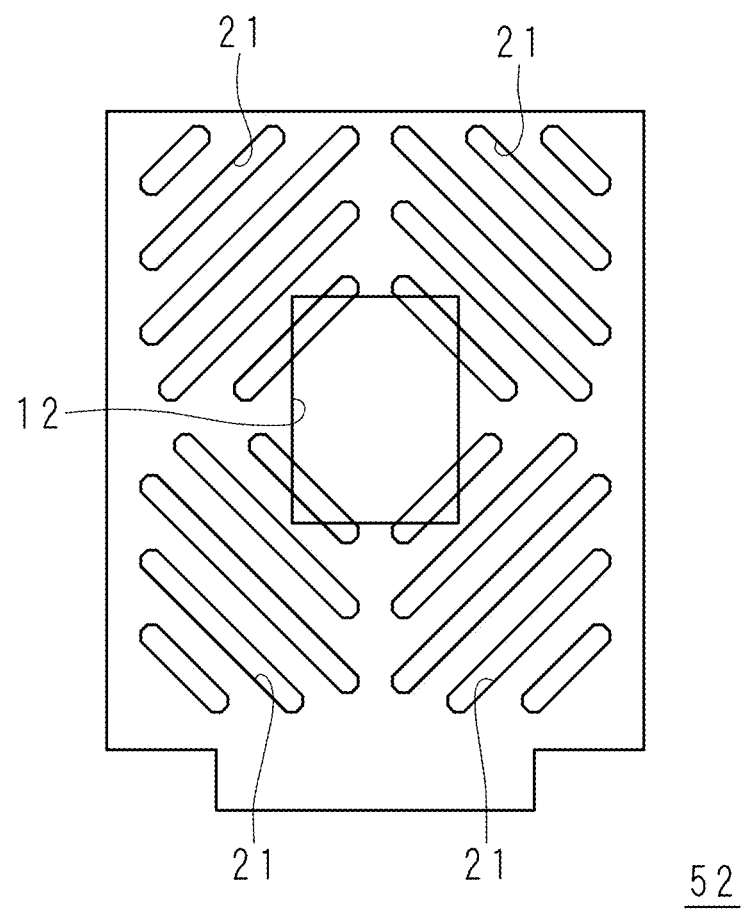
FIG. 22 is a plan view illustrating a pixel electrode of an active matrix substrate in the pixel region of a multi-domain VATN mode liquid crystal display apparatus.
Figure 23:
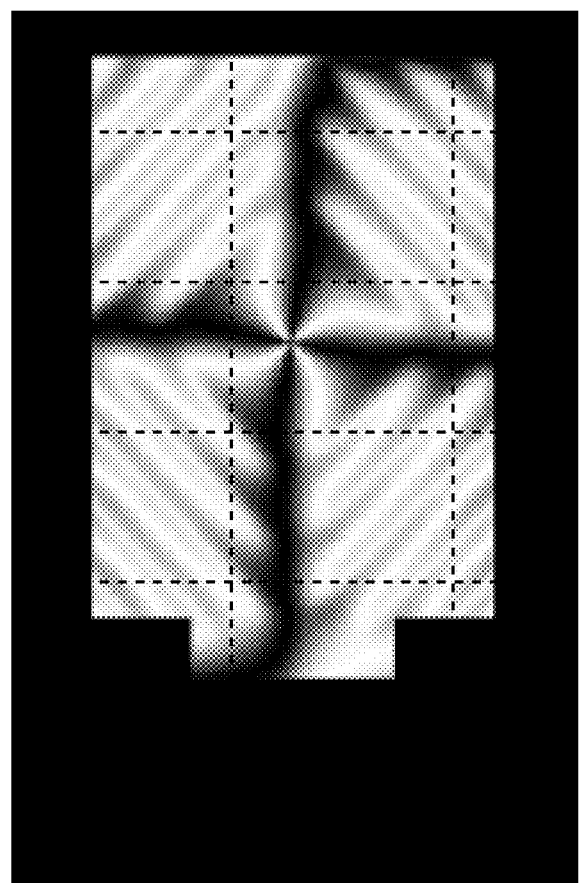
FIG. 23 is a plan view illustrating the light transmission state of the pixel region in FIG. 22.
Figure 24:
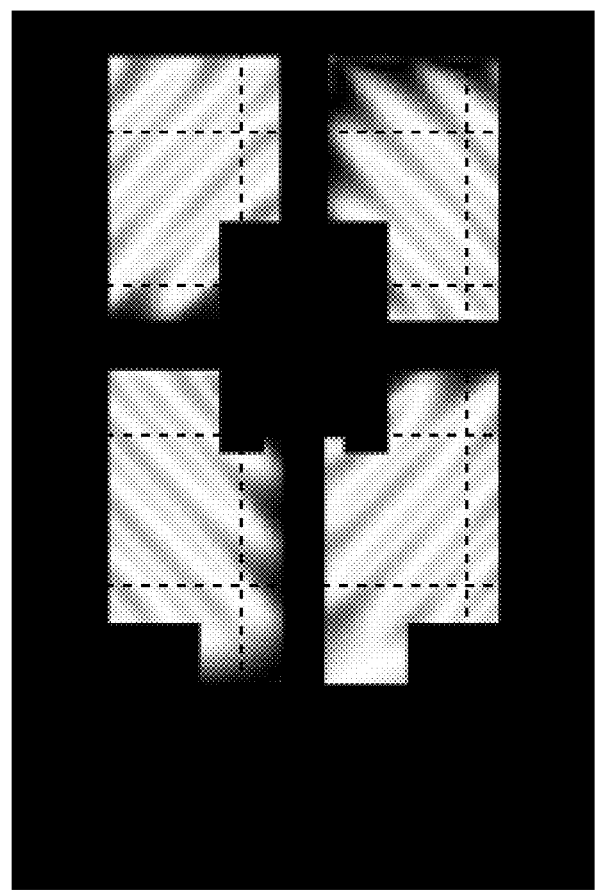
FIG. 24 is a plan view illustrating the light transmission state of the pixel region when the wiring and the contact hole are disposed.
Figure 25:
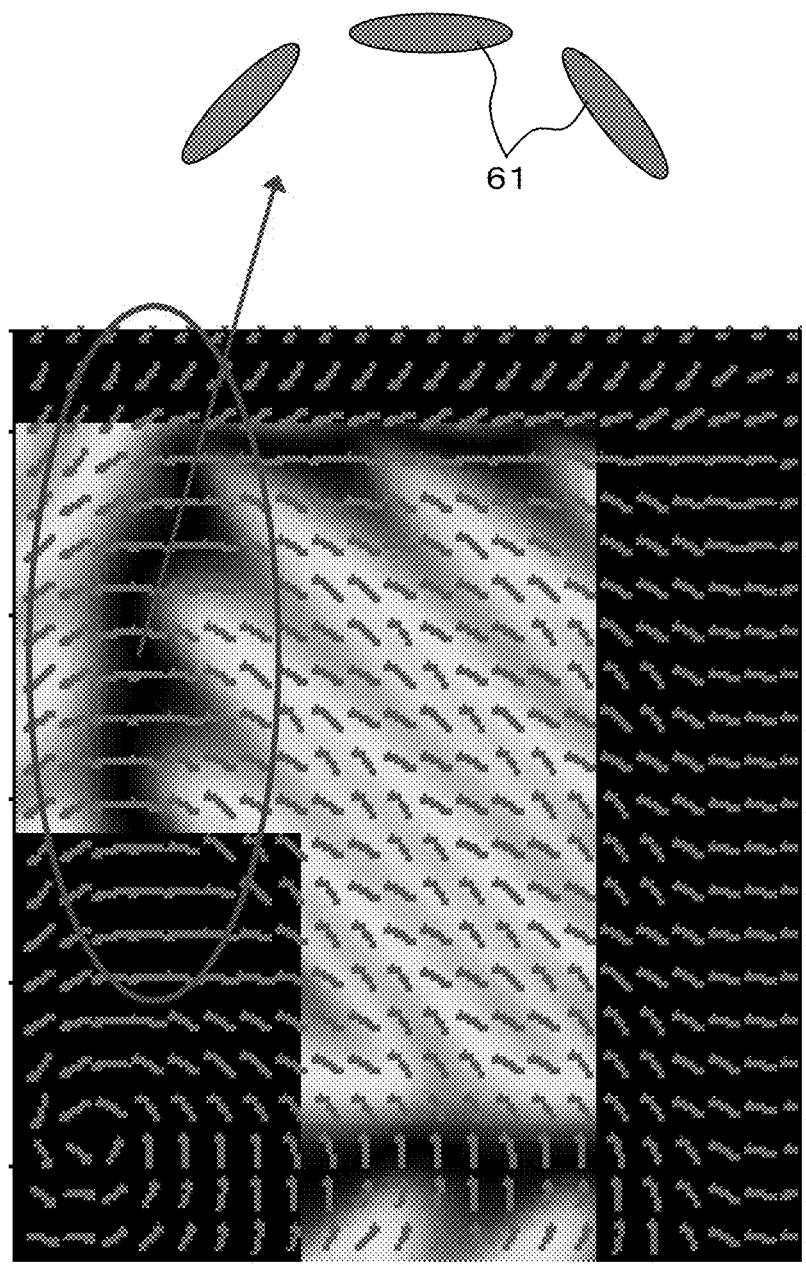
FIG. 25 is a partial enlarged view of FIG. 24.
Figure 26:
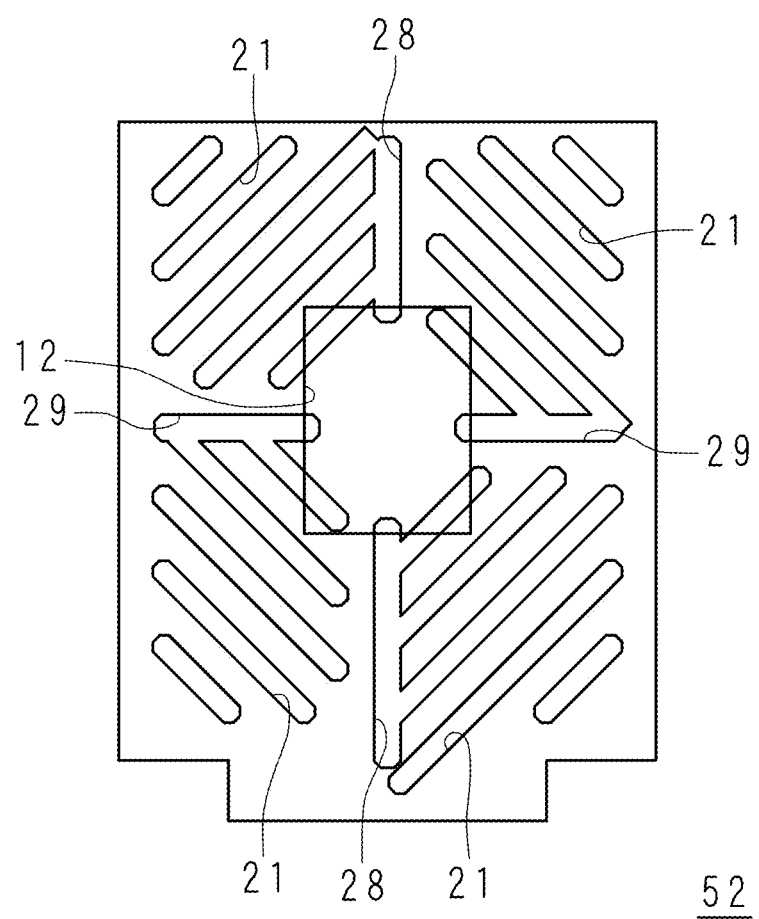
FIG. 26 is a plan view illustrating a pixel electrode of an active matrix substrate in the pixel region of another liquid crystal display apparatus.
Figure 27:
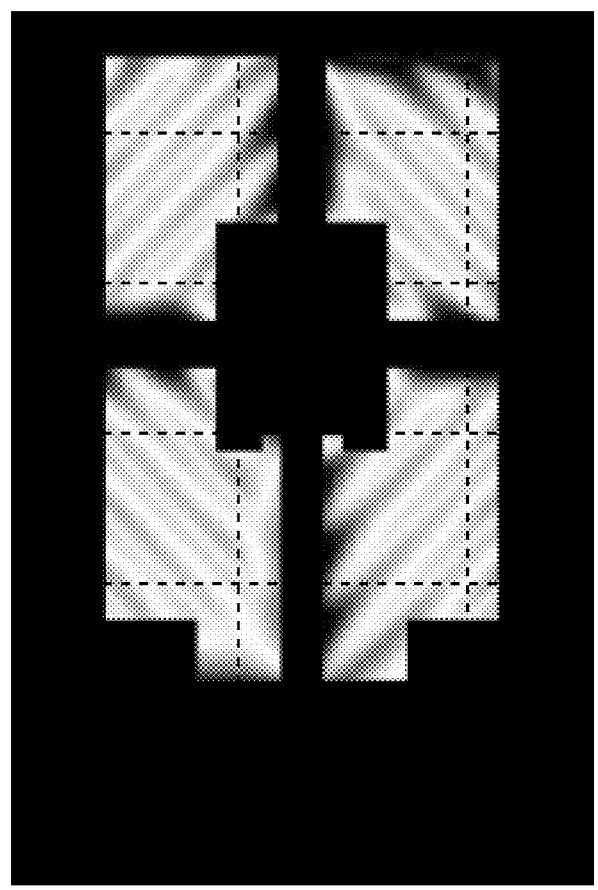
FIG. 27 is a plan view illustrating the light transmission state of the pixel region in FIG. 26.

The pixel electrode of Comparative Example 2 is a pixel electrode which has only oblique slits 21 as illustrated in FIG. 22.

The transmittances of light of the pixel electrodes prepared in the above Examples and Comparative Examples 1 and 2 were calculated, and results thereof are illustrated in the above Table 1 and FIG. 15.

Figure 16:
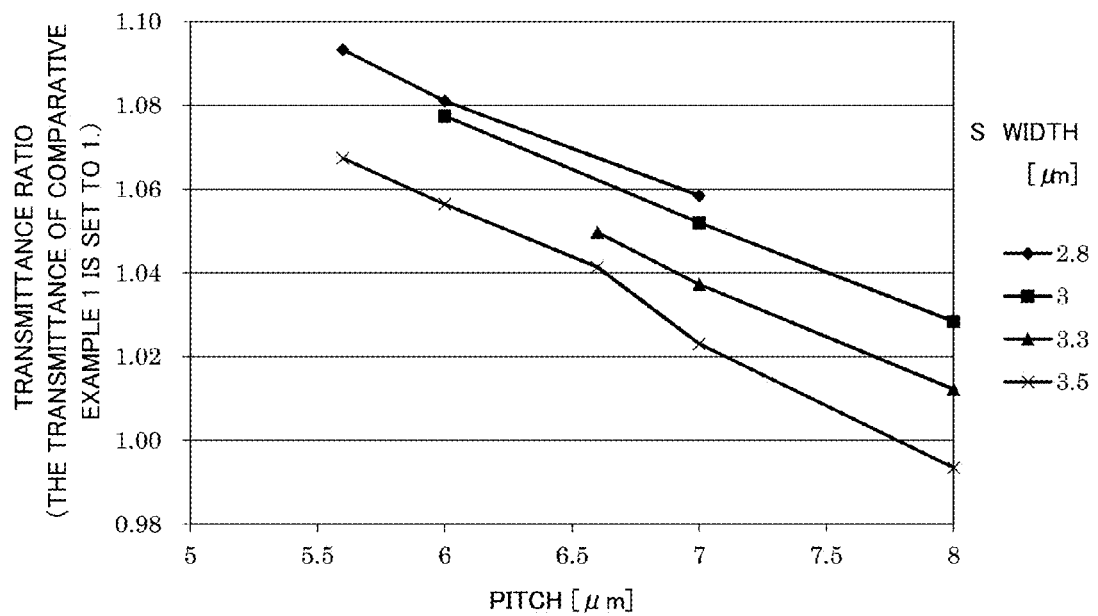
FIG. 16 is a graph illustrating a relation between the pitch and a transmittance ratio when the width of oblique slits is changed in the liquid crystal display apparatuses of Embodiments 1 and 2.

In addition, when the transmittance of the pixel electrode of Comparative Example 1 is set to 1, the ratio of the transmittance of the pixel electrode of each Example and Comparative Example is illustrated in the above Table 1 and FIG. 16.

From the above Table 1, FIGS. 15 and 16, it can be seen that the pixel electrode 2 having the longitudinal slits 22 and the lateral slits 23 had larger improved transmittance of light than the pixel electrodes of Comparative Examples 1 and 2.

Further, it can be that, when the oblique slit 21 has a small S width and a small pitch, the transmittance of light was more improved.

(2) Pixel Electrodes of Embodiments 3 and 4

Examples 15 and 16

Pixel electrodes 2 of Examples 15 and 16 corresponding to Embodiment 3 were formed by patterning so as to have a width (gap) (L: μm) between the oblique slits 21, a width (S: μm) of the oblique slits 21, a pitch (L+S), a width (μm) of the longitudinal slits 22 and the lateral slits 23 of each numerical value as illustrated in Table 2 below.

TABLE 2

| EXAMPLE | A | B | C | D | E | F |
|---|---|---|---|---|---|---|
| 15 | 2.8 | 2.8 | 5.6 | 3.5 | 3.7 | 1.16E+00 |
| 16 | 2.8 | 2.8 | 5.6 | 3.5 | 3.6 | 1.12E+00 |
| 17 | 4 | 3 | 7 | 3.5 | 3.6 | 1.12506 |
| 18 | 4 | 3 | 7 | 3.5 | 3.5 | 1.083556 |
| COMPARATIVE EXAMPLE2 | — | — | — | — | 3.2 | 1 |
| COMPARATIVE EXAMPLE 1 | 4 | 3 | 7 | — | 3.3 | 1.037207 |

A: WIDTH BETWEEN THE OBLIQUE SLITS (L: μ m)
B: WIDTH OF THE OBLIQUE SLIT (S: μ m)
C: PITCH(L + S)
D: WIDTH OF THE LONGITUDINAL SLIT AND THE LATERAL SLIT (μ m)
E: TRANSMITTANCE
F: TRANSMITTANCE RATIO

Examples 17 and 18

Pixel electrodes 2 of Examples 17 and 18 corresponding to Example 4 were formed by patterning so as to have a width (gap) (L: μm) between the oblique slits 21, a width (S: μm) of the oblique slits 21, a pitch (L+S), a width (μm) of the longitudinal slits 24 and the lateral slits 25 of each numerical value as illustrated in the above Table 2.

Comparative Examples are the same as the above-described Comparative Examples 1 and 2.

Figure 17:
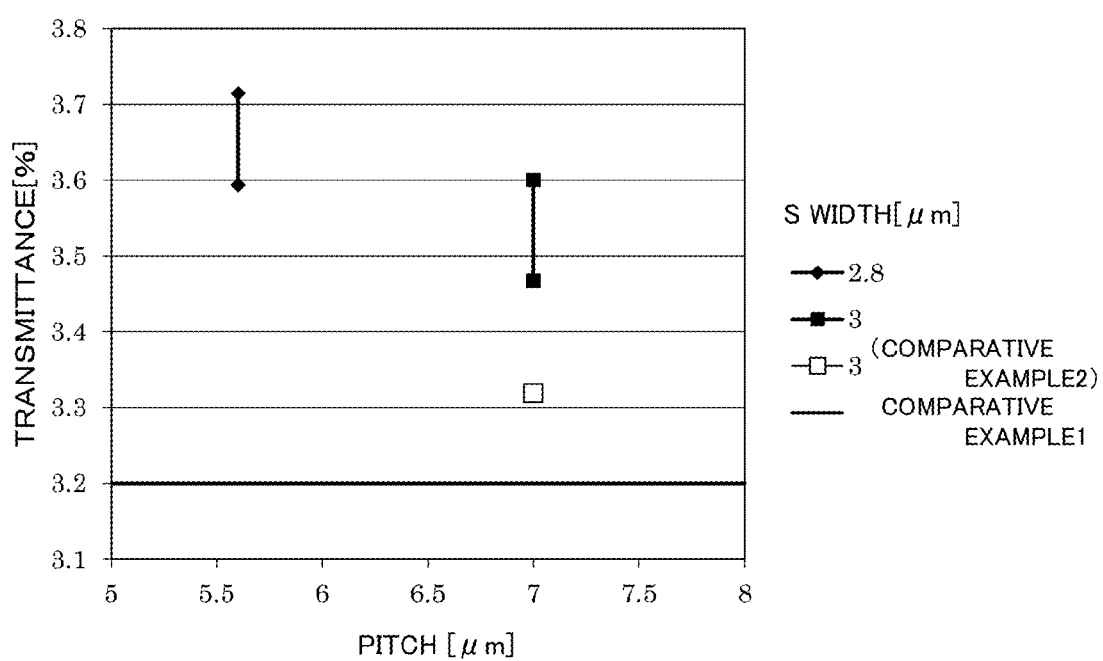
FIG. 17 is a graph illustrating a relation between the pitch and transmittance when the width of oblique slits is changed in the liquid crystal display apparatuses of Embodiments 3 and 4.
Figure 19:
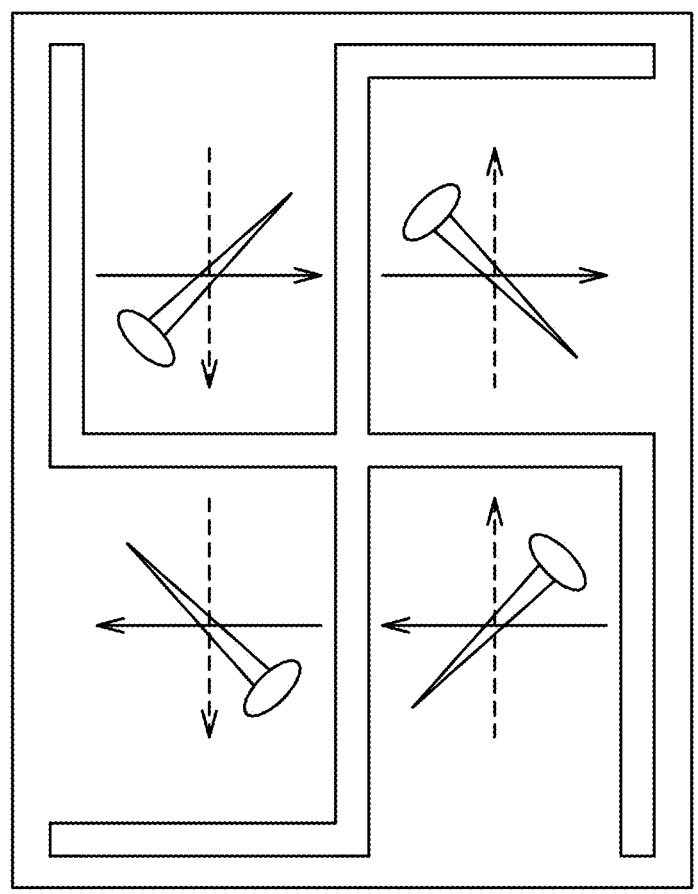
FIG. 19 is a plan view illustrating a pixel region of a VATN mode liquid crystal display apparatus having a 4D structure.
Figure 20:
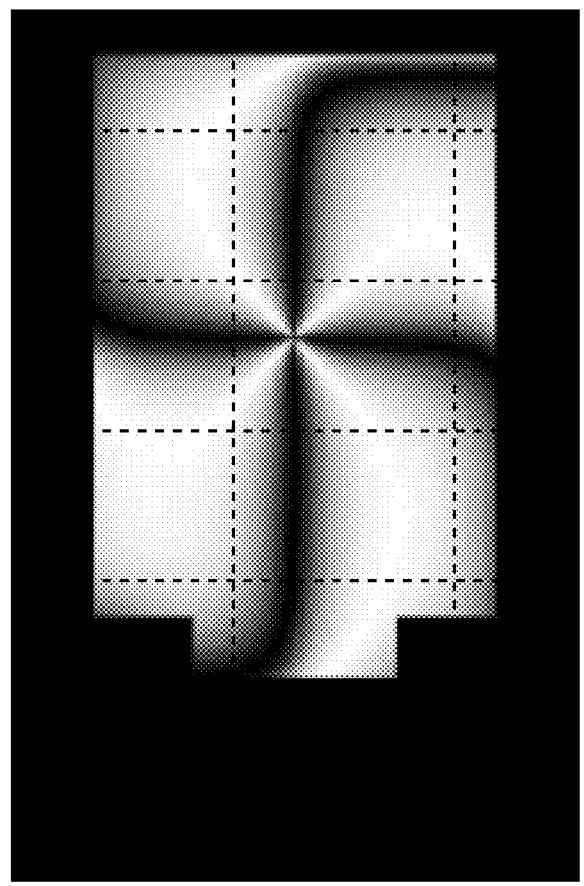
FIG. 20 is a plan view illustrating the light transmission state of the pixel region in FIG. 19.
Figure 21:
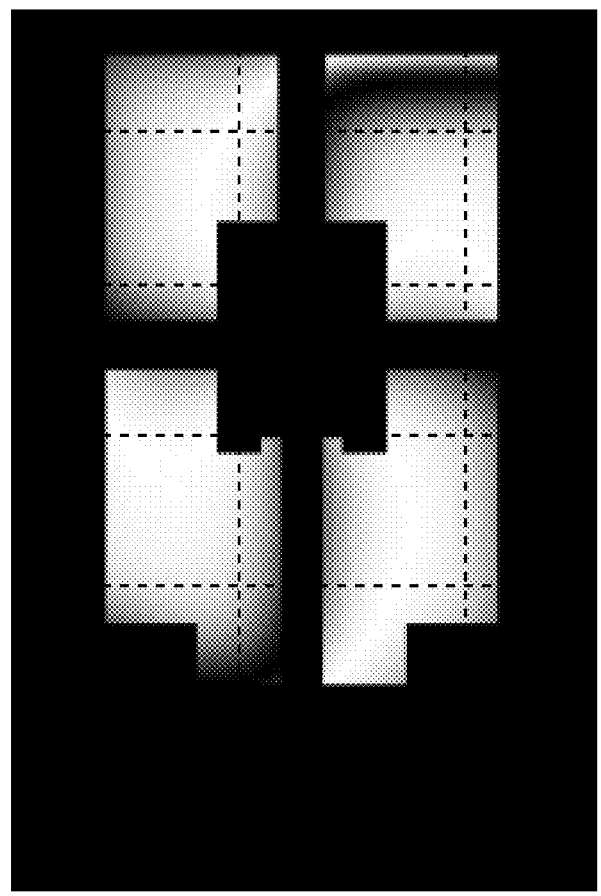
FIG. 21 is a plan view illustrating the light transmission state of the pixel region when the wiring and a contact hole are disposed.

The transmittances of light of the pixel electrodes prepared in the above Examples and Comparative Examples 1 and 2 were calculated, and results thereof are illustrated in the above Table 2 and FIG. 17.

In addition, when the transmittance of the pixel electrode of Comparative Example 1 is set to 1, the ratio of the transmittance of the pixel electrode of each Example and Comparative Example is illustrated in the above Table 2 and FIG. 18.

From the above Table 2, FIGS. 17 and 18, it can be seen that the pixel electrodes 2 of examples 15 and 16 having the longitudinal slits 22 and the lateral slits 23, and the pixel electrodes 2 of examples 17 and 18 having the longitudinal slits 24 and the lateral slits 25 had larger improved transmittance of light than the pixel electrodes of Comparative Examples 1 and 2.

In addition, it can be seen that, when the oblique slit 21 has a small S width and a small pitch, the transmittance of light was more improved.

Further, when having the same S width and pitch as each other, the pixel electrodes 2 according to Embodiments 3 and 4 had larger improved transmittance of light than the pixel electrodes 2 according to above-described Embodiments 1 and 2.

As described above, it is possible to control the transmittance of the pixel electrode by appropriately designing the values of the L width and S width of the oblique slits 21, the shape and length of the longitudinal slits 22 and 24, and lateral slits 23 and 25 or the like.

In addition, it should be understood that the present invention is not limited to the above-described Embodiments 1 to 5, and various modifications may be made within the scope defined by the appended claims. That is, embodiments obtained by combining technical means appropriately modified within the scope defined by the appended claims are also included in the technical scope of the present invention.

For example, the longitudinal slits 22 and the lateral slits 23 are not limited to the case of being provided in continuity, however they may be intermittently provided, and a plurality of slits may be provided in plurality to each other. The longitudinal slits 22 and the lateral slits 23 are not limited to the case of having a uniform width, however, in order to easily position the liquid crystal molecules, they preferably have a uniform width.

Provided is a liquid crystal display apparatus which has a reduced area of a dark line generated when light is transmitted through a pixel region, and excellent transmittance of light and image quality. The liquid crystal display apparatus has two substrates which respectively have an electrode and a photo alignment film sequentially formed on respective one surfaces, and are disposed so that the one surfaces thereof face to each other, wherein a liquid crystal layer including a vertical alignment type liquid crystal material is interposed between the photo alignment films; a plurality of pixel regions formed on the substrate in a matrix shape in a plane direction of the substrate; and at least two liquid crystal domains which are included in each pixel region, and have standard alignment directions different from each other defined by the photo alignment films. One electrode has oblique slits extending parallel to each standard alignment direction at the region corresponding to each liquid crystal domain. In addition, longitudinal slits and extending in the column direction are provided at the boundary portions of the liquid crystal domains arranged in the row direction, and lateral slits and extending in the row direction at the boundary portions of the liquid crystal domains arranged in the column direction. The longitudinal slits and the lateral slits are independent from the oblique slits without continuing to the oblique slits.

The invention claimed is:

1. A liquid crystal display apparatus having a vertical alignment twisted nematic (VATN) mode wherein:
   a color filter substrate which has an electrode and a photo alignment film sequentially formed on one surface and an active matrix substrate which has a plurality of pixel electrodes and a photo alignment film sequentially formed on one surface are disposed so that the one surfaces face to each other;
   a liquid crystal layer including a vertical alignment type liquid crystal material is interposed between the photo alignment films; and
   a plurality of pixel regions are formed on the active matrix substrate in a matrix shape in a plane direction of the substrate, wherein:
   each pixel region has four liquid crystal domains arranged in a matrix shape;
   pre-tilt directions whose orientations are opposite to each other are regulated by the photo alignment film provided on the active matrix substrate;
   pre-tilt directions which are orthogonal to the pre-tilt directions of the active matrix substrate and whose orientations are opposite to each other are regulated by the photo alignment film provided on the color filter substrate;
   the left obliquely 45° upward tilt direction of the upper right side liquid crystal domain is defined by the upward pre-tilt direction of the active matrix substrate and the rightward pre-tilt direction of the color filter substrate;
   the right obliquely 45° upward tilt direction of the lower right side liquid crystal domain is defined by the upward pre-tilt direction of the active matrix substrate and the leftward pre-tilt direction of the color filter substrate;
   the left obliquely 45° downward tilt direction of the upper left side liquid crystal domain is defined by the downward pre-tilt direction of the active matrix substrate and the rightward pre-tilt direction of the color filter substrate;
   the right obliquely 45° downward tilt direction of the lower left side liquid crystal domain is defined by the downward pre-tilt direction of the active matrix substrate and the leftward pre-tilt direction of the color filter substrate; and
   wherein
   each pixel electrode has a plurality of oblique opening parts which extend parallel to the tilt direction corresponding to each liquid crystal domain;
   a lateral opening part which extends in a row direction at a boundary portion of the two liquid crystal domains arranged in parallel with a column direction, in each pixel electrode, without being continued to the oblique opening part;
   a longitudinal opening part which extends in the column direction at a boundary portion of the two liquid crystal domains arranged in parallel with the row direction, in each pixel electrode, without being continued to the oblique opening part.

2. The liquid crystal display apparatus according to claim 1, wherein the one electrode has a third opening part which extends in the one direction between the two liquid crystal domains arranged in the other direction, with being continued to the opening part at one end part side of the one direction.

3. The liquid crystal display apparatus according to claim 1, wherein a position of the lateral opening part or a position of the longitudinal opening part is matched with a position of a wiring which is formed on the one substrate.

4. The liquid crystal display apparatus according to claim 1, wherein the one substrate has a contact hole nearer to an end part of the pixel region.

* * * * *